(12) United States Patent
Bassa et al.

(10) Patent No.: US 10,839,554 B2
(45) Date of Patent: Nov. 17, 2020

(54) IMAGE LABELING FOR CLEANING ROBOT DEEP LEARNING SYSTEM

(71) Applicant: iRobot Corporation, Bedford, MA (US)

(72) Inventors: Angela Bassa, Stoneham, MA (US); Husain al-Mohssen, Cambridge, MA (US)

(73) Assignee: iRobot Corporation, Bedford, MA (US)

(*) Notice: Subject to any disclaimer, the term of this patent is extended or adjusted under 35 U.S.C. 154(b) by 213 days.

(21) Appl. No.: 15/863,786

(22) Filed: Jan. 5, 2018

(65) Prior Publication Data

US 2019/0213755 A1    Jul. 11, 2019

(51) Int. Cl.
| | |
|---|---|
| *G06K 9/00* | (2006.01) |
| *G06T 7/73* | (2017.01) |
| *G06N 3/08* | (2006.01) |
| *G06T 19/00* | (2011.01) |
| *G06K 9/62* | (2006.01) |
| *B25J 9/00* | (2006.01) |

(52) U.S. Cl.
CPC ............ *G06T 7/75* (2017.01); *G06K 9/00671* (2013.01); *G06K 9/00805* (2013.01); *G06K 9/6271* (2013.01); *G06N 3/08* (2013.01); *G06T 19/006* (2013.01); *B25J 9/0003* (2013.01); *G06T 2210/12* (2013.01)

(58) Field of Classification Search
CPC ............ B25J 9/0003; G06K 9/00671; G06K 9/00805; G06K 9/6271; G06N 3/08; G06T 19/006; G06T 7/75; G06T 2207/20081; G06T 2207/20084; G06T 2210/12; G06T 7/74
See application file for complete search history.

(56) References Cited

U.S. PATENT DOCUMENTS

| | | | |
|---|---|---|---|
| 6,757,571 B1* | 6/2004 | Toyama | G06N 20/00 700/47 |
| 2010/0067741 A1* | 3/2010 | Stolkin | G06K 9/3241 382/103 |
| 2012/0062732 A1* | 3/2012 | Marman | G08B 13/19682 348/142 |

(Continued)

OTHER PUBLICATIONS

Angra et al., "Machine Learning and its Applications: A Review," 2017 International Conference on Big Data Analytics and Computational Intelligence (ICBDAC), Mar. 23-25, 2017, 4 pages.

(Continued)

*Primary Examiner* — Tom Y Lu
(74) *Attorney, Agent, or Firm* — Fish & Richardson P.C.

(57) ABSTRACT

A computer-implemented method for labeling images includes capturing, using an augmented-reality enabled device, a first set of images that include views of a first object; at the augmented-reality enabled device, for each of the first set of images, identifying the first object and generating a bounding box that is associated with the first object; receiving an input providing a first label for the first object; and at the augmented-reality enabled device, for each of at least some of the first set of images, associating the first label with the first object bound by the bounding box.

16 Claims, 14 Drawing Sheets

(56) References Cited

U.S. PATENT DOCUMENTS

2018/0012082 A1* 1/2018 Satazoda ............ G06K 9/00805

OTHER PUBLICATIONS

Bagnell et al., "Learning for Autonomous Navigation," IEEE Robotics & Automation Magazine, Jun. 2010, 11 pages.
Ellis et al., "Autonomous Navigation and Sign Detector Learning," 2013 IEEE Workshop on Robot Vision (WORV), Jan. 15-17, 2013, 8 pages.
Fromm et al., "Robust Multi-Algorithm Object Recognition Using Machine Learning Methods," 2012 IEEE International Conference on Multisensor Fusion and Integration for Intelligent Systems (MFI) Sep. 13-15, 2012. Hamburg, Germany, 8 pages.
Golding et al., "Indoor navigation using a diverse set of cheap, wearable sensors," Digest of Papers. Third International Symposium on Wearable Computers, Oct. 18-19, 1999, 8 pages.
Howard et al., "MobileNets: Efficient Convolutional Neural Networks for Mobile Vision Applications," Joshua's Blog, retrieved from the Internet <https://joshua19881228.github.io/2017-07-19-MobileNet/>, retrieved on Nov. 15, 2018, 7 pages.
LeCun et al., "Learning Methods for Generic Object Recognition with Invariance to Pose and Lighting," Proceedings of the 2004 IEEE Computer Society Conference on Computer Vision and Pattern Recognition, 2004. CVPR 2004, Jun. 27-Jul. 2, 2004, 8 pages.
Louridas et al., "Machine Learning," IEEE Software, vol. 33 Issue 5 • Sep.-Oct. 2016, 6 pages.
Malowany et al., "Visual Reinforcement Learning for Object Recognition in Robotics," 2016 ICSEE International Conference on the Science of Electrical Engineering, Jan. 1995, 14(1):1-5.
Moore et al., "Efficient Memory-based Learning for Robot Control," Dissertation submitted for the degree of Doctor of Philosophy in the University of Cambridge, Oct. 1990, 42 pages.
Murase et al., "Visual Learning and Recognition of 3-D Objects from Appearance," International Journal of Computer Vision, 1995, 14:5-24.
Paletta et al., "Active object recognition by view integration and reinforcement learning," Robotics and Autonomous Systems, 2000, 31:71-86.
Pontil et al. "Support Vector Machines for 3D Object Recognition," IEEE Transactions on Pattern Analysis and Machine Intelligence, Jun. 1998, 20(6):637-646.
Shankar et al., "Hierarchy of Localized Random Forests for Video Annotation," ResearchGate; Conference Paper, Aug. 2012, 11 pages.
Stauffer et al., "Learning Patterns of Activity Using Real-Time Tracking," IEEE Transactions on Pattern Analysis and Machine Intelligence, Aug. 2000, 22(8):747-757.
Thrun, "Learning metric-topological maps for indoor mobile robot navigation," Artificial Intelligence, 1998, 99:21-71.
Tsutsumi et al., "Hybrid Approach of Video Indexing and Machine Learning for Rapid Indexing and Highly Precise Object Recognition," Proceedings 2001 International Conference on Image Processing (Cat. No. 01CH37205), Oct. 7-10, 2001, 4 pages.
Vijayanarasimhan et al., "Active Frame Selection for Label Propagation in Videos," University of Texas Austin, in Proceedings of the European Conference on Computer Vision, 2012, 14 pages.
Viola et al., "Rapid Object Detection using a Boosted Cascade of Simple Features," Proceedings of the 2001 IEEE Computer Society Conference on Computer Vision and Pattern Recognition. CVPR 2001, Dec. 8-14, 2001, 8 pages.
Xu et al., "Extreme Learning Machine Based Fast Object Recognition," 2012 15th International Conference on Information Fusion, Jul. 9-12, 2012, 7 pages.
Zuo et al., "A Reinforcement Learning Based Robotic Navigation System," 2014 IEEE International Conference on Systems, Man, and Cybernetics, Oct. 5-8, 2014, San Diego, CA, USA, 6 pages.

* cited by examiner

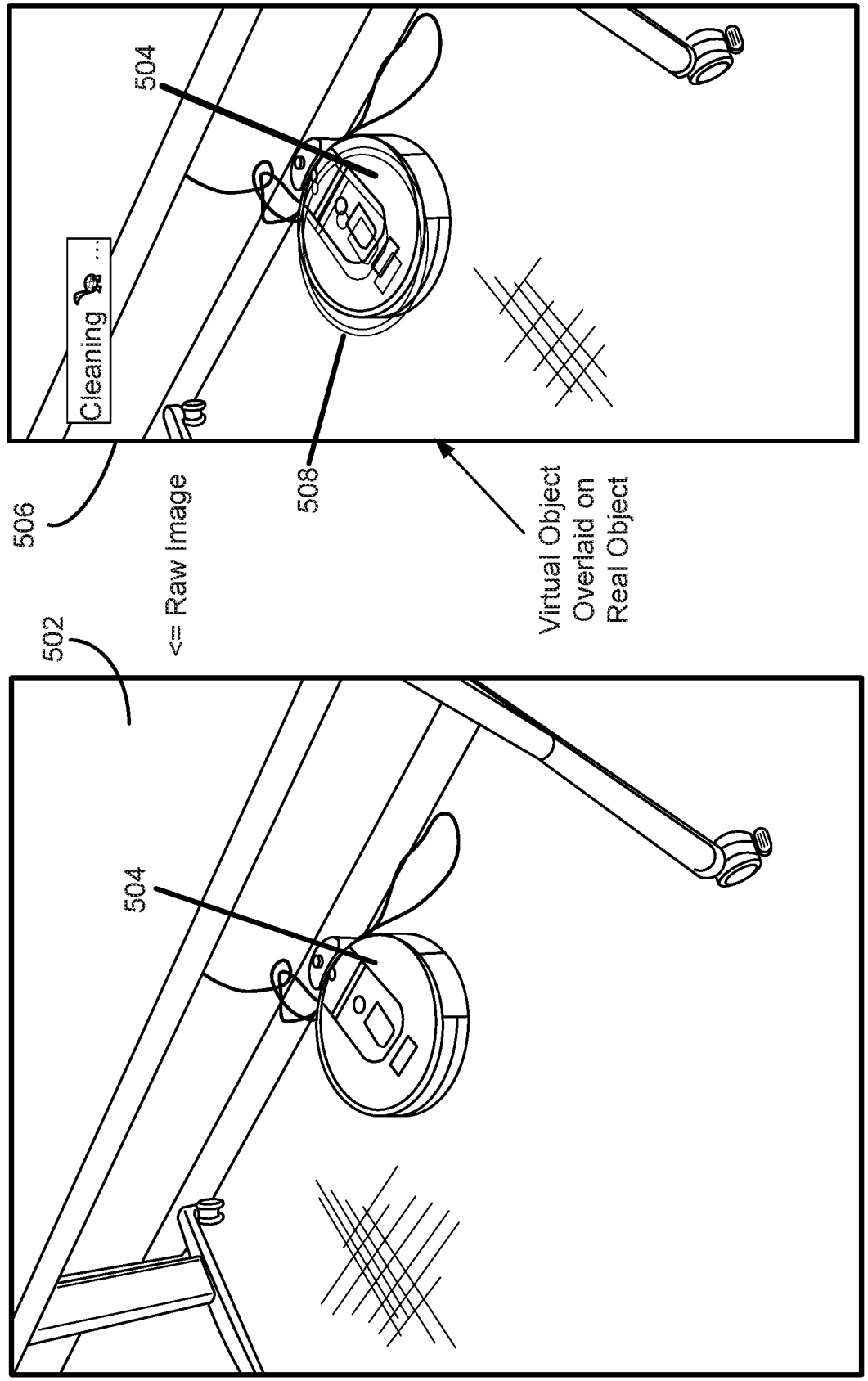

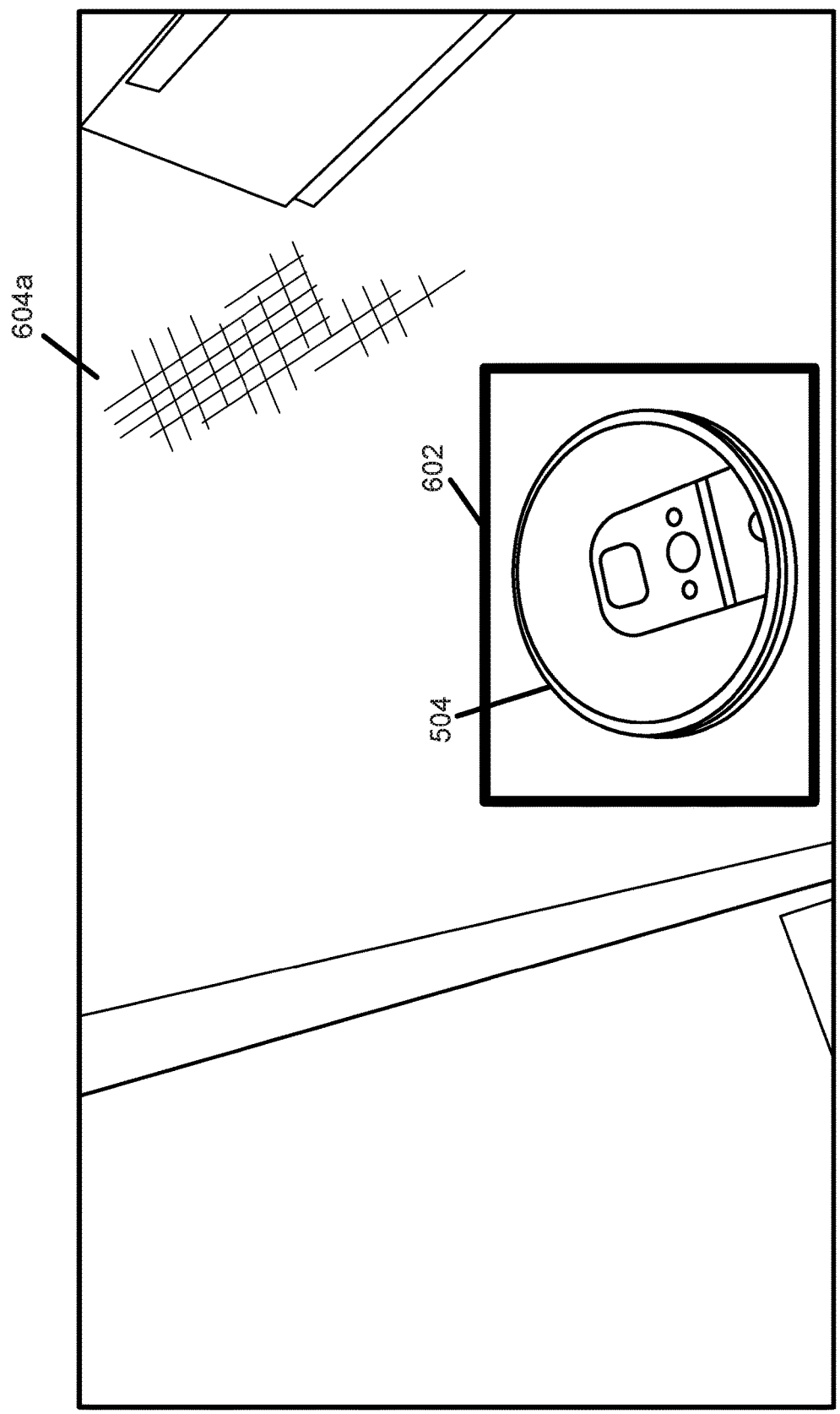

IMAGE LABELING FOR CLEANING ROBOT DEEP LEARNING SYSTEM

TECHNICAL FIELD

The description relates to image labeling for cleaning robot deep learning systems.

BACKGROUND

In some examples, when training a deep machine learning system to recognize objects in images, a training set of images is used in which the objects in the training images have been properly labeled. For example, a set of training images having various types of flowers that have been correctly labeled can be used to train a neural network for detecting the various types of flowers. Typically, a machine learning system needs a large number of training samples. Manually labeling the objects in images is labor intensive and takes a long time.

SUMMARY

In a general aspect, a computer-implemented method for labeling images includes receiving, at one or more data processors, a first set of images that include views of a first object; receiving a first input identifying the first object in one of the first set of images, the first input providing a first label for the first object; and processing, using the one or more data processors, the other ones of the first set of images to automatically identify the first object in the other ones of the first set of images, and automatically associate the first object with the first label.

Implementations of the method can include one or more of the following features. The method can include training a recognition module using the first set of images as input to the recognition module, in which the first object has been associated with the first label, to generate a trained recognition module that is configured to recognize the first object in additional images.

Training the recognition module can include training a neural network to generate a trained neural network that is configured to recognize the first object in the additional images.

The first set of images can include views of a mobile cleaning robot. The method can include processing the first set of images to generate a second set of images such that the second set of images include top-view images of the mobile cleaning robot, and processing the top-view images of the mobile cleaning robot to identify an orientation angle of the mobile cleaning robot. Training the recognition module can include training the recognition module to recognize an orientation angle of the mobile cleaning robot in additional images.

Processing the other ones of the first set of images can include, for each of at least some of the first set of images, identifying edges of the first object and generating a bounding box that bounds the edges of the first object.

Processing the other ones of the first set of images can include identifying the bounding box in each of the images and associating the object within the bounding box with the first label.

The method can include establishing a coordinate system of a virtual space that corresponds to a real-world space in which the first object is located, receiving a user input for overlaying a virtual object on the object in the one of the first set of images, automatically overlaying the virtual object on the object in the other ones of the first set of images, and automatically identifying the first object in the other ones of the first set of images based on the virtual object in the other ones of the first set of images.

The method can include, for each of the other ones of the first set of images, generating a bounding box that bounds the virtual object, and associating the object within the bounding box with the first label.

The method can include, for each of the other ones of the first set of images, prior to generating the bounding box, determining a difference between the image with the virtual object overlaid on the object and the image without the virtual object, and determining a size and a position of the bounding box based on the difference.

The method can include capturing a video that includes at least one of (i) images of the first object taken from a plurality of viewing angles relative to the first object, (ii) images of the first object taken from a plurality of distances relative to the first object, or (iii) images of the first object taken under a plurality of lighting conditions for the first object, in which the first set of images can include frames of the video.

The method can include displaying, on a user interface, the image that includes the first object; receiving, through the user interface, a user input identifying the first object; and receiving, through the user interface, the label for the first object.

Receiving the first set of images can include receiving a first set of images that include views of a mobile cleaning robot. Training the recognition module can include training the recognition module to recognize the mobile cleaning robot in the additional images.

In another general aspect, a computer-implemented method includes using an augmented-reality enabled device to capture a first set of images that include views of a first object; at the augmented-reality enabled device, for each of the first set of images, identifying the first object and generating a bounding box that is associated with the first object; receiving an input providing a first label for the first object; and at the augmented-reality enabled device, for each of at least some of the first set of images, associating the first label with the first object bound by the bounding box.

Implementations of the method can include one or more of the following features. The method can further include training a recognition module using the first set of images, in which the first object has been associated with the first label, to generate a trained recognition module that is configured to recognize the first object in additional images.

The first set of images can include at least one of (i) images of the first object taken from a plurality of viewing angles relative to the first object, (ii) images of the first object taken from a plurality of distances relative to the first object, or (iii) images of the first object taken under a plurality of lighting conditions for the first object.

The method can include establishing a coordinate system of a virtual space that corresponds to a real-world space in which the first object is located, and analyzing at least some of the first set of images to track a correspondence between the virtual space and the real-world space.

The method can include receiving an input for overlaying a virtual object on the object in one of the first set of images; automatically overlaying the virtual object on the object in the other ones of the first set of images based on the correspondence between the virtual space and the real-world space; and automatically identifying the first object in the other ones of the first set of images based on the virtual object in the other ones of the first set of images.

The method can include, for each of the other ones of the first set of images, generating a bounding box that bounds the virtual object, and associating the object within the bounding box with the first label.

The method can include, for each of the other ones of the first set of images, prior to generating the bounding box, determining a difference between the image with the virtual object overlaid on the object and the image without the virtual object; and determining a size and a position of the bounding box based on the difference.

Training the recognition module can include training a neural network generate a trained neural network that is configured to recognize the first object in the additional images.

The first set of images can include views of a mobile cleaning robot. Training the recognition module can include training the recognition module to recognize the mobile cleaning robot in the additional images.

The first set of images can include views of a mobile cleaning robot. The method can include processing the first set of images to generate the second set of images such that the second set of images include top-view images of the mobile cleaning robot; and processing the top-view images of the mobile cleaning robot to identify an orientation angle of the mobile cleaning robot. Training the recognition module can include training the recognition module to recognize an orientation angle of the mobile cleaning robot in additional images.

In another general aspect, an apparatus includes an input module configured to receive a first set of images that include views of a first object; and an identification module configured to receive an input identifying the first object in one of the first set of images, the input providing a first label for the first object. The identification module is further configured to process the other ones of the first set of images to automatically identify the first object in the other ones of the first set of images. The apparatus includes a labeling module configured to associate the first object in the first set of images with the first label.

Implementations of the apparatus can include one or more of the following features. The apparatus can further include a training module configured to train a recognition module using the first set of images, in which the first object has been associated with the first label, to generate a trained recognition module configured to recognize the first object in additional images.

The recognition module can include a neural network.

The identification module can be configured to, for each of at least some of the first set of images, process the image to identify edges of the first object and generate a bounding box that bounds the edges of the first object.

The labeling module can be configured to identify the bounding box in the image and associate the object within the bounding box with the first label.

The apparatus can include an augmented reality module configured to: establish a coordinate system of a virtual space that corresponds to a real-world space in which the first object is located; receive a user input for overlaying a virtual object on the object in the one of the first set of images; and automatically overlay the virtual object on the object in the other ones of the first set of images. The identification module can be configured to automatically identify the first object in the other ones of the first set of images based on the virtual object in the other ones of the first set of images.

The identification module can be configured to: for each of the other ones of the first set of images, generate a bounding box that bounds the virtual object; and associate the object within the bounding box with the first label.

The identification module can be configured to: for each of the other ones of the first set of images, prior to generating the bounding box, determine a difference between the image with the virtual object overlaid on the object and the image without the virtual object; and determine a size and a position of the bounding box based on the difference.

The apparatus can include at least one camera configured to capture the first set of images and provide the first set of images to the input module.

The first set of images can include frames of a video, and the identification module can be configured to identify the first object in the frames of the video.

The apparatus can include a user interface configured to: display the image that includes the first object, receive a user input identifying the first object, and receive the first label for the first object.

The first set of images can include views of a mobile cleaning robot. The training module can be configured to train the recognition module to recognize the mobile cleaning robot in the additional images.

The first set of images can include views of a mobile cleaning robot. The apparatus can include an image processing module configured to process the first set of images to generate the second set of images such that the second set of images include top-view images of the mobile cleaning robot. The identification module can be configured to identify an orientation angle of the mobile cleaning robot in the top-view images. The training module can be configured to train the recognition module to recognize an orientation angle of the mobile cleaning robot in additional images.

In another general aspect, an apparatus comprises an augmented-reality enabled device configured to capture a first set of images that include views of a first object; an identification module configured to process at least some of the first set of images to identify the first object, and generate a bounding box associated with the first object; and a labeling module configured to associate the first label with the first object bound by the bounding box in each of at least some of the first set of images.

Implementations of the apparatus can include one or more of the following features. The apparatus can further include a training module configured to train a recognition module using the first set of images, in which the first object has been associated with the first label, to generate a trained recognition module configured to recognize the first object in additional images.

The recognition module can include a neural network.

The first set of images can include views of a mobile cleaning robot, and the training module can be configured to train the recognition module to recognize the mobile cleaning robot in the additional images.

The apparatus can include an augmented reality module configured to: establish a coordinate system of a virtual space that corresponds to a real-world space in which the first object is located; and analyze at least some of the first set of images to track a correspondence between the virtual space and the real-world space.

The augmented reality module can be configured to: receive an input for overlaying a virtual object on the object in one of the first set of images, and automatically overlay the virtual object on the object in the other ones of the first set of images based on the correspondence between the virtual space and the real-world space. The identification module can be configured to automatically identify the first object in the other ones of the first set of images based on the virtual object in the other ones of the first set of images.

The identification module can be configured to: for each of the other ones of the first set of images, generate a bounding box that bounds the virtual object, and associate the object within the bounding box with the first label.

The identification module can be configured to: for each of the other ones of the first set of images, prior to generating the bounding box, determine a difference between the image with the virtual object overlaid on the object and the image without the virtual object; and determine a size and a position of the bounding box based on the difference.

Other features and advantages of the description will become apparent from the following description, and from the claims.

Unless otherwise defined, all technical and scientific terms used herein have the same meaning as commonly understood by one of ordinary skill in the art to which this invention belongs. In case of conflict with patents or patent applications incorporated herein by reference, the present specification, including definitions, will control.

DESCRIPTION OF DRAWINGS

FIG. 5 show a raw image and a processed image that include views of an example object.

FIGS. 6A to 6G are images that include views of an example object and bounding boxes associated with the object.

DESCRIPTION

In this document, we describe a novel system for efficiently labeling images that can be used for training machine learning systems. An augmented reality (AR) toolkit is used to overlay a virtual object on a real-world object and maintain a correspondence between the virtual object and the real-world object. When the user takes a video of the object while moving around the object, the augmented reality toolkit generates a video for the augmented reality session (referred to as the "AR video') in which the virtual object is overlaid on the real-world object. The difference between the original video and the AR video is that in the AR video, the virtual object is overlaid on the real-world object, whereas the original video shows the real-world object without the virtual object. By subtracting each original video frame from the corresponding AR video frame, a series of images that include mostly only the virtual object is obtained. The position of the virtual object is determined, and a bounding box that bounds the virtual object can be determined. When the bounding box is overlaid on the original video frame, the bounding box approximately bounds the real-world object. The user provides a label for the object in a first video frame, and the bounding box in the first video frame is associated with the label. Because the bounding box bounds the same object for all the video frames, the system can automatically associate the same label with the bounding box in the remaining video frames. As a result, it is possible to quickly obtain many images of an object bound by a bounding box that is associated with a correct label.

Figure 1:
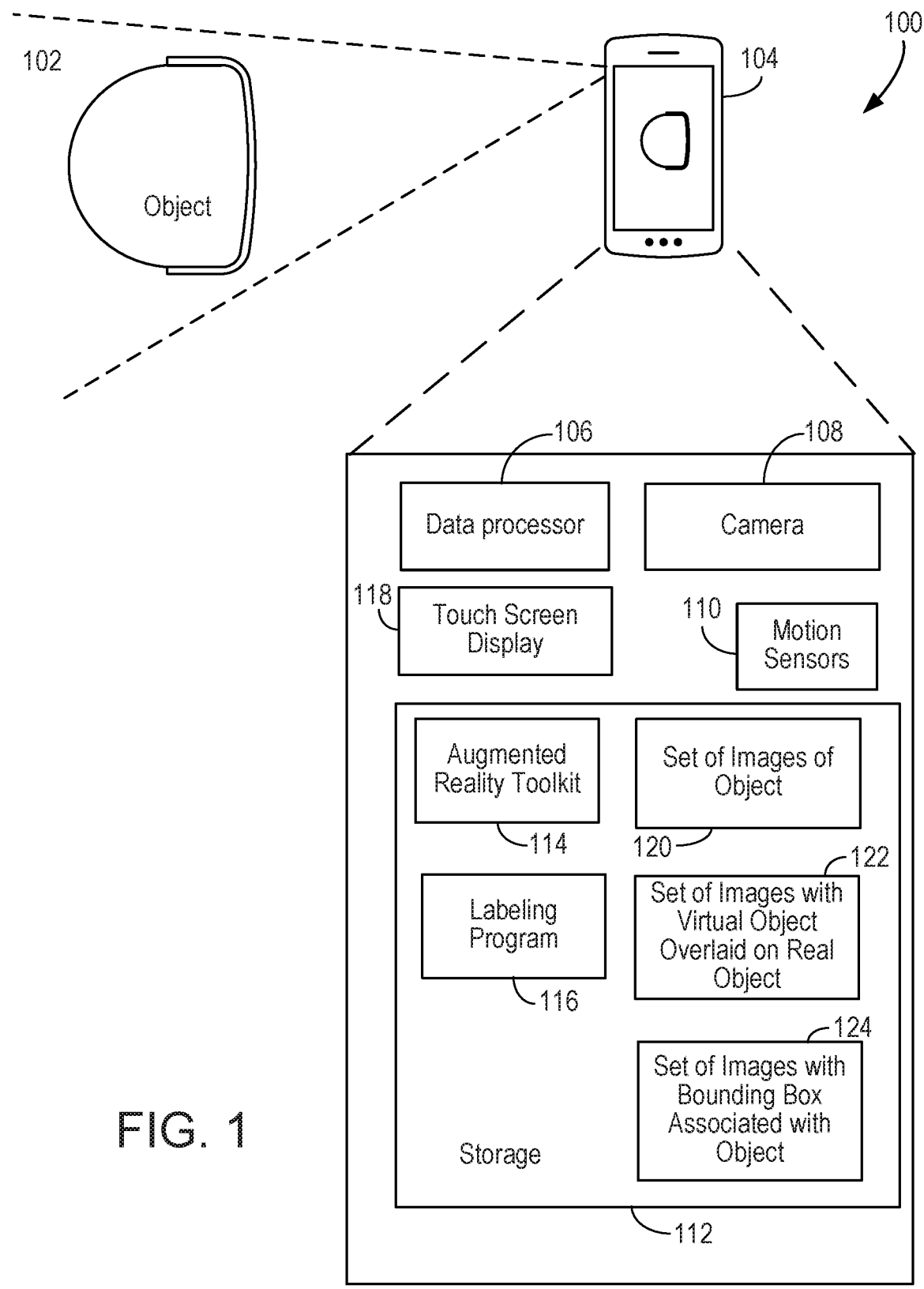
FIG. 1 is a schematic diagram of an example system for generating labeled images for use in training a machine learning module.

Referring to FIG. 1, a system 100 for efficiently labeling images includes a mobile computing device 104 that can be, e.g., a mobile phone, a tablet computer, or a wearable computing device, such as smart glasses. The mobile computing device 104 includes one or more data processors 106, and one or more cameras 108. Each camera 108 includes one or more image sensors that are sensitive to visible light and optionally, infrared light. For example, the camera 108 can be used to capture images of an object 102 or to take a video of the object 102. The mobile computing device 104 includes one or more motion sensors 110 that enable detection of the movement and orientation of the device 104.

The mobile computing device 104 includes a storage device 112 storing program instructions for an augmented reality toolkit 114 and program instructions for a labeling program 116. The labeling program 116 is responsible for managing the automatic labeling process, including associating bounding boxes with the correct label. The augmented reality module 114 provides tools that allow the user to identify objects in the environment in an augmented reality session.

The mobile computing device 104 includes a touch screen display 118 that enables the user to view images captured by the camera 108 and to provide labels for the objects in the images. The storage device 112 stores a set of images 120 of the object 102, a set of images 122 with a virtual object overlaid on the real-world object, and a set of images 124 with a bounding box that approximately bounds the object in which the bounding box is associated with a label.

The user 10 generates a virtual object that corresponds to the real-world object 102. If the object 102 is relatively flat, the virtual object can be a two-dimensional (2D) virtual object that resembles the object 102. When the 2D virtual object is overlaid on the real-world object 102 in the augmented reality session, the 2D virtual object will cover a substantial portion of the real-world object. A bounding box that bounds the 2D virtual object will also bound a substantial portion of the real-world object.

If the object 102 has substantial length, width, and height, it may be preferable to use a 3D virtual object that resembles the object 102. This way, during the augmented reality session, when the object is viewed from various viewing angles, the 3D virtual object will be correctly overlaid on the real-world object 102 and cover a substantial portion of the real-world object. A bounding box that bounds the 3D virtual object will also bound a substantial portion of the real-world object.

Examples of the augmented reality toolkit 114 include Apple ARToolKit, or ARKit, available from Apple Inc., Cupertino, Calif.; DAQRI ARToolKit, available from DAQRI, Los Angeles, Calif.; Vuforia SDK, available from PTC Inc., Needham, Mass.; Wikitude SDK, available from Wikitude GmbH, Salzburg, Austria; and ARCore, available from Google LLC, Mountain View, Calif.

Figure 2:
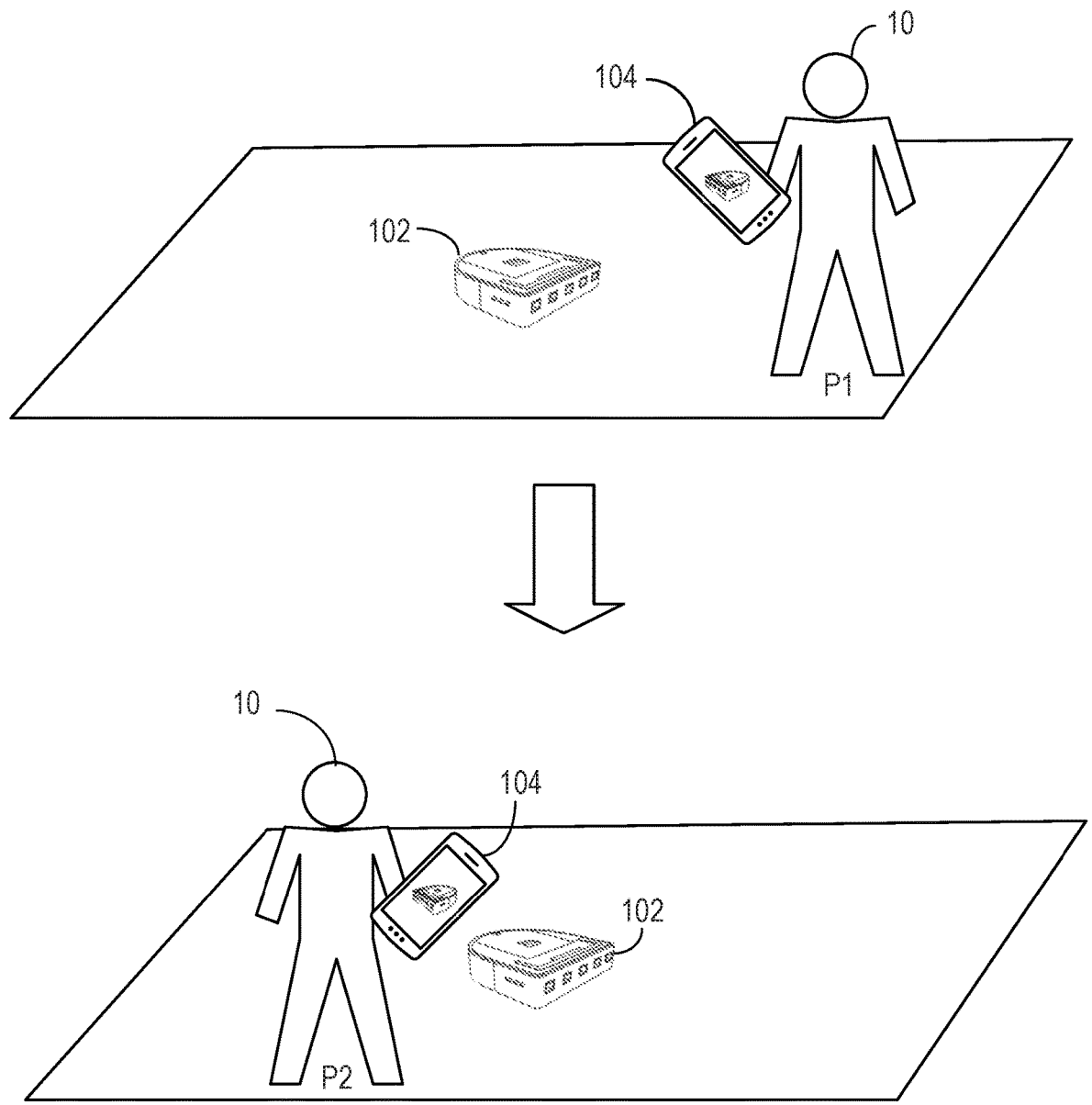
FIG. 2 is a schematic diagram showing a camera capturing images of an example object from various viewing angles and distances.

Referring to FIG. 2, a user 10 executes the augmented reality toolkit 114 to start an augmented reality session and establishes an augmented reality coordinate system. The user 10 points the camera 108 at the object 102 and takes a video of the object 102. In this example, the object 102 is a mobile cleaning robot. A live image of the object 102 is shown on the touch screen display 118. Using the augmented reality toolkit 114, the user 10 manually places the virtual object onto the real-world object in the image. The display 118 shows the virtual object overlaid on the real-world object. The user 10 provides a label for the object 102. In this example, the user 10 provides the label "Mobile Cleaning Robot."

The user 10 moves around the object 102, such as from a location P1 to a location P2, and records the video of the object 102. The augmented reality toolkit 114 maintains a correspondence between the virtual object and the real-world object 102, and continues to overlay the virtual object on the object 102 as long as the object 102 is within the view of the camera 108.

Assuming that the video is 30 frames per second, a one-minute video results in over a thousand video frames, in which each augmented reality result video frame shows the virtual object overlaid on the real-world object. The storage device 112 stores the raw video frames (set 120) without the virtual object, and the augmented reality result video frames (set 122) that have the virtual object overlaid on the real-world object.

The labeling program 116 subtracts each video frame in the set 120 from the corresponding video frame in the set 122 to generate a set of video frames that mostly only include the virtual object (this is the "difference set of video frames"). The labeling program 116 performs image processing to determine a bounding box that bounds the virtual object in each video frame in the difference set of video frames. The bounding box can be determined based on the maximum and minimum x and y coordinates of the pixels of the virtual object. The labeling program 116 overlays the bounding box onto the video frame in the original set 120 of video frames, and associates the bounding box with the label provided by the user. This results in a set 124 of video frames in which each video frame has a bounding box around the object, and the bounding box is associated with the label provided by the user. In this example, the bounding box in each video frame is associated with the label "Mobile Cleaning Robot."

Figure 3:
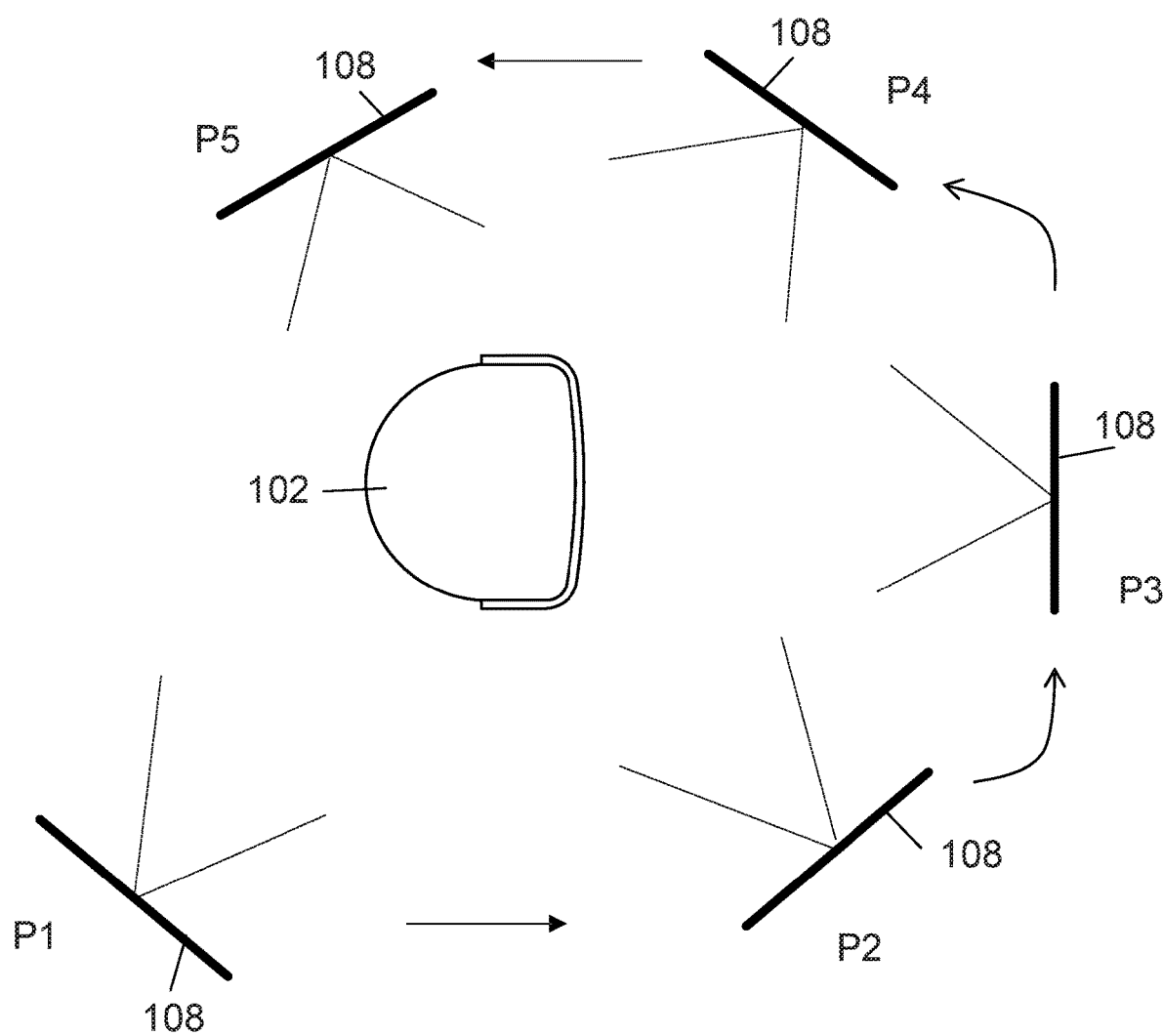
FIG. 3 is a top-view diagram showing images of an example object being captured from various viewing angles and distances.

FIG. 3 is a diagram showing the camera 108 being held at various positions P1 to P5 to capture a video or images of the object 102 from various viewing angles and viewing distances.

For example, the video of the object 102 is captured from the perspective of the future use case. If the video frames will be used to train a mobile cleaning robot so that the mobile cleaning robot can recognize the object 102, then it is preferable to take the video of the object 102 from the view point of the mobile cleaning robot. If the camera of the mobile cleaning robot is a few inches above the floor, then the video of the object 102 is taken from a view point that is a few inches above the floor.

In some implementations, a mobile cleaning robot can be equipped with a data processor, a camera, motion sensors, an augmented reality toolkit, and a labeling program, similar to those of the mobile computing device 104. The mobile cleaning robot executes the augmented reality toolkit to start an augmented reality session and establishes an augmented reality coordinate system. The user 10 controls the mobile cleaning robot to point its camera toward an object, such as a chair, and take a video of the object. The mobile cleaning robot can transmit a live image of the object (as seen through the camera of the mobile cleaning robot) to the mobile computing device 104 to cause the live image to be shown on the touch screen display 118.

The user 10 manually places the virtual object (e.g., a virtual chair) onto the real-world object (e.g., a chair) in the image. The user input for placing the virtual object is transmitted to the mobile cleaning robot so that the augmented reality toolkit executing at the mobile cleaning robot can properly overlay the virtual object onto the real-world object. The augmented reality toolkit at the mobile cleaning robot generates an augmented reality result video that is transmitted to the mobile computing device 104. The augmented reality result video shows the virtual object overlaid on the real-world object. Thus, the display 118 on the mobile computing device 104 shows the virtual object overlaid on the real-world object as seen from the viewpoint of the mobile cleaning robot. The user 10 provides a label for the object. In this example, the user 10 provides the label "Chair."

The mobile cleaning robot moves around the object (e.g., chair), and records the video of the object. The augmented reality toolkit executing at the mobile cleaning robot maintains a correspondence between the virtual object (e.g., virtual chair) and the real-world object (e.g., chair), and continues to overlay the virtual object on the object as long as the object is within the view of the camera of the mobile cleaning robot.

The labeling program executing at the mobile cleaning robot generates a set of video frames in which each video frame has a bounding box around the object (e.g., chair), and the bounding box is associated with the label provided by the user. In this example, the bounding box in each video frame is associated with the label "Chair." The properly labeled video frames can be used to train a machine learning module, such as a convolutional neural network, to recognize the chair in images captured by a mobile cleaning robot.

In some implementations, the augmented reality toolkit and the labeling program are executed at a server computer. The server computer controls the augmented reality session and communicates with the mobile cleaning robot and the mobile computing device. The mobile cleaning robot streams a video of the object (e.g., chair) to the server computer, which generates augmented reality result video that is streamed to the mobile computing device 104. The user 10 manually places the virtual object (e.g., a virtual chair) onto the real-world object (e.g., a chair). The user input for placing the virtual object is transmitted to the server computer so that the augmented reality toolkit executing at the server computer can properly overlay the virtual object onto the real-world object. In this example, the display 118 on the mobile computing device 104 shows the virtual object overlaid on the real-world object as seen from the viewpoint of the mobile cleaning robot. The user 10 provides a label for the object. In this example, the user 10 provides the label "Chair."

The mobile cleaning robot moves around the object (e.g., chair), and records the video of the object. The mobile cleaning robot streams the video to the server computer. The augmented reality toolkit executing at the server computer maintains a correspondence between the virtual object (e.g., virtual chair) and the real-world object (e.g., chair), and continues to overlay the virtual object on the object as long as the object is within the view of the camera of the mobile cleaning robot.

The server computer generates a set of video frames in which each video frame has a bounding box around the object (e.g., chair), and the bounding box is associated with the label ("Chair") provided by the user using a process similar to that described above.

Figure 4:
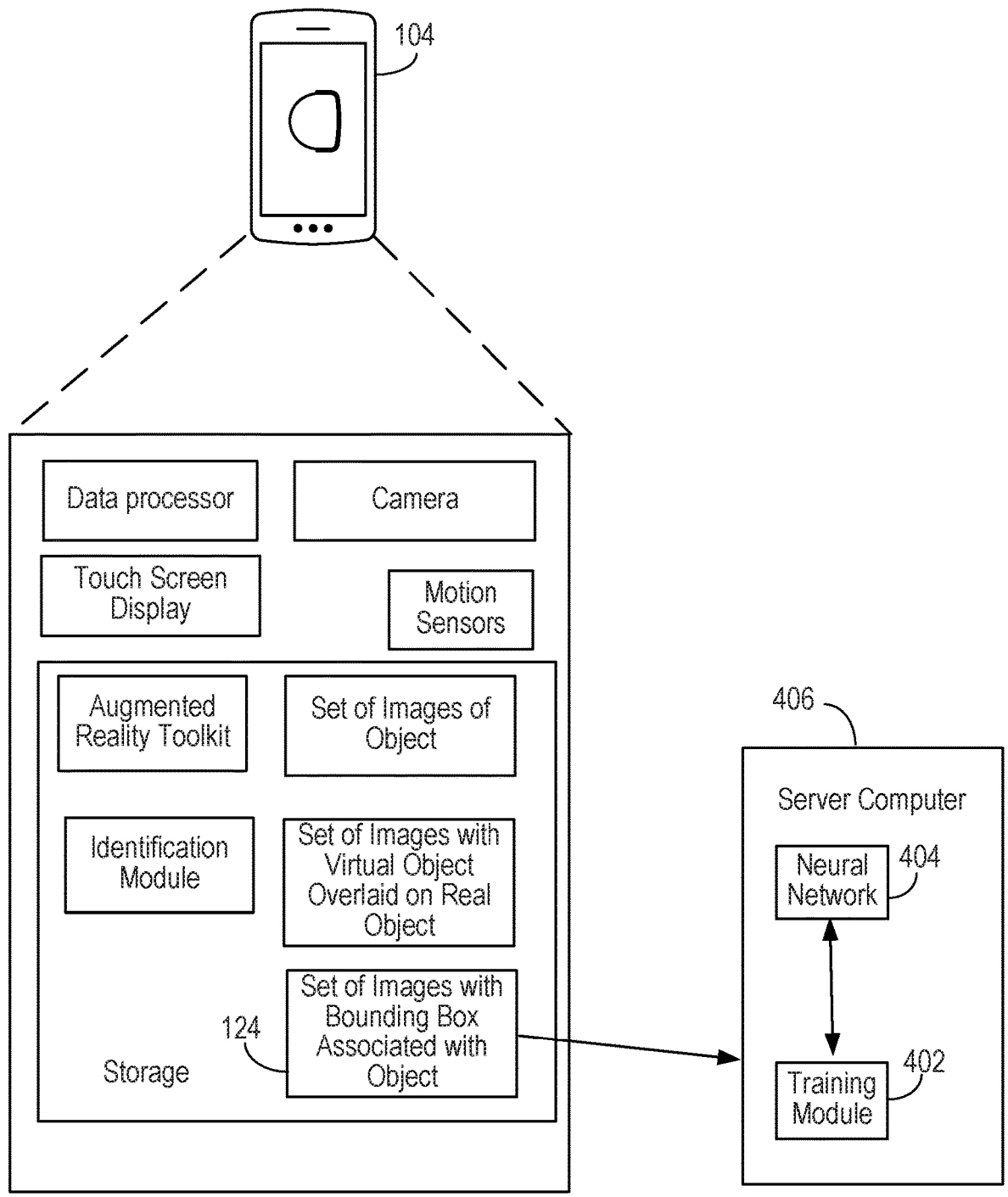
FIG. 4 is a schematic diagram of an example system for training a machine learning module.
Figure 6B:
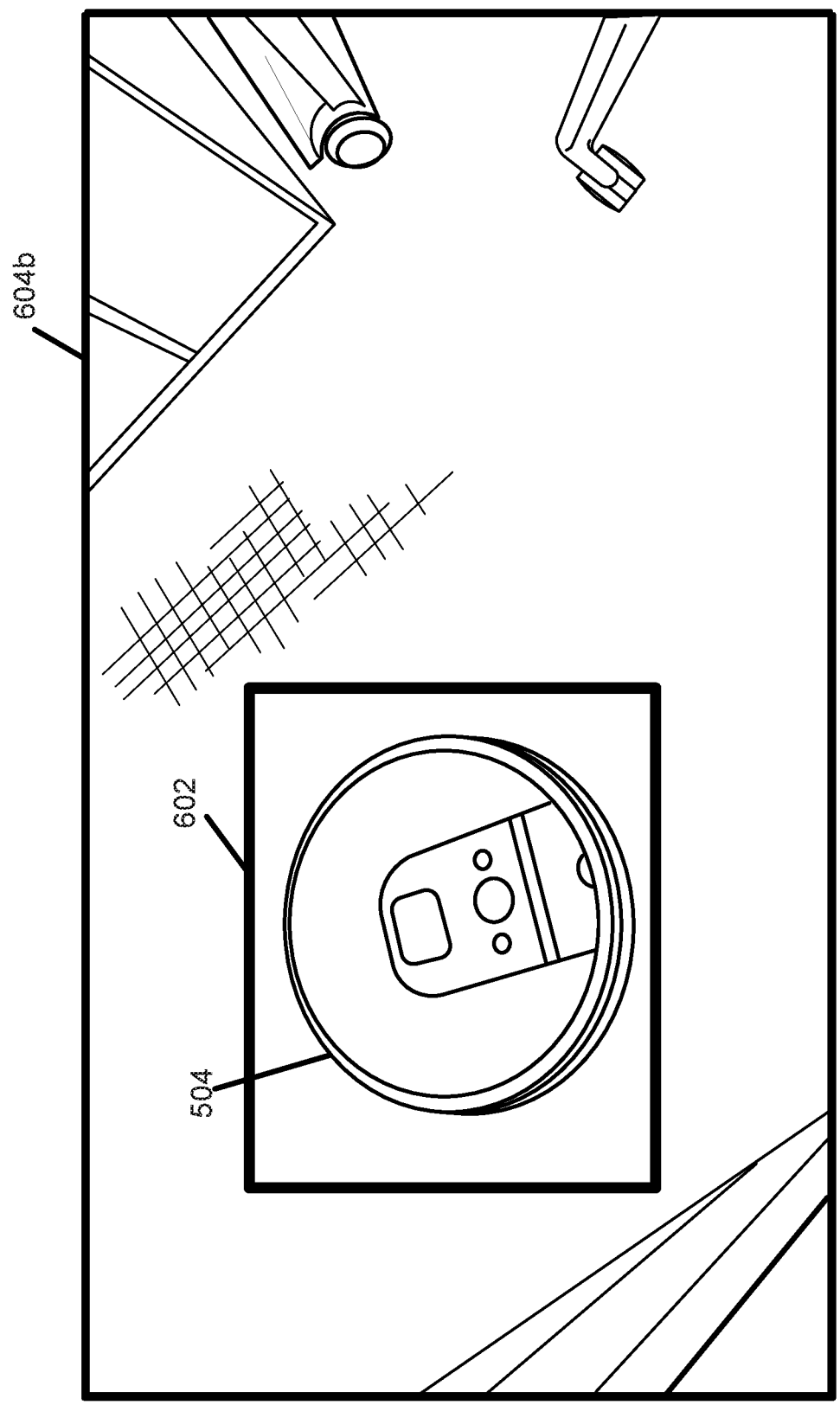
Figure 6C:
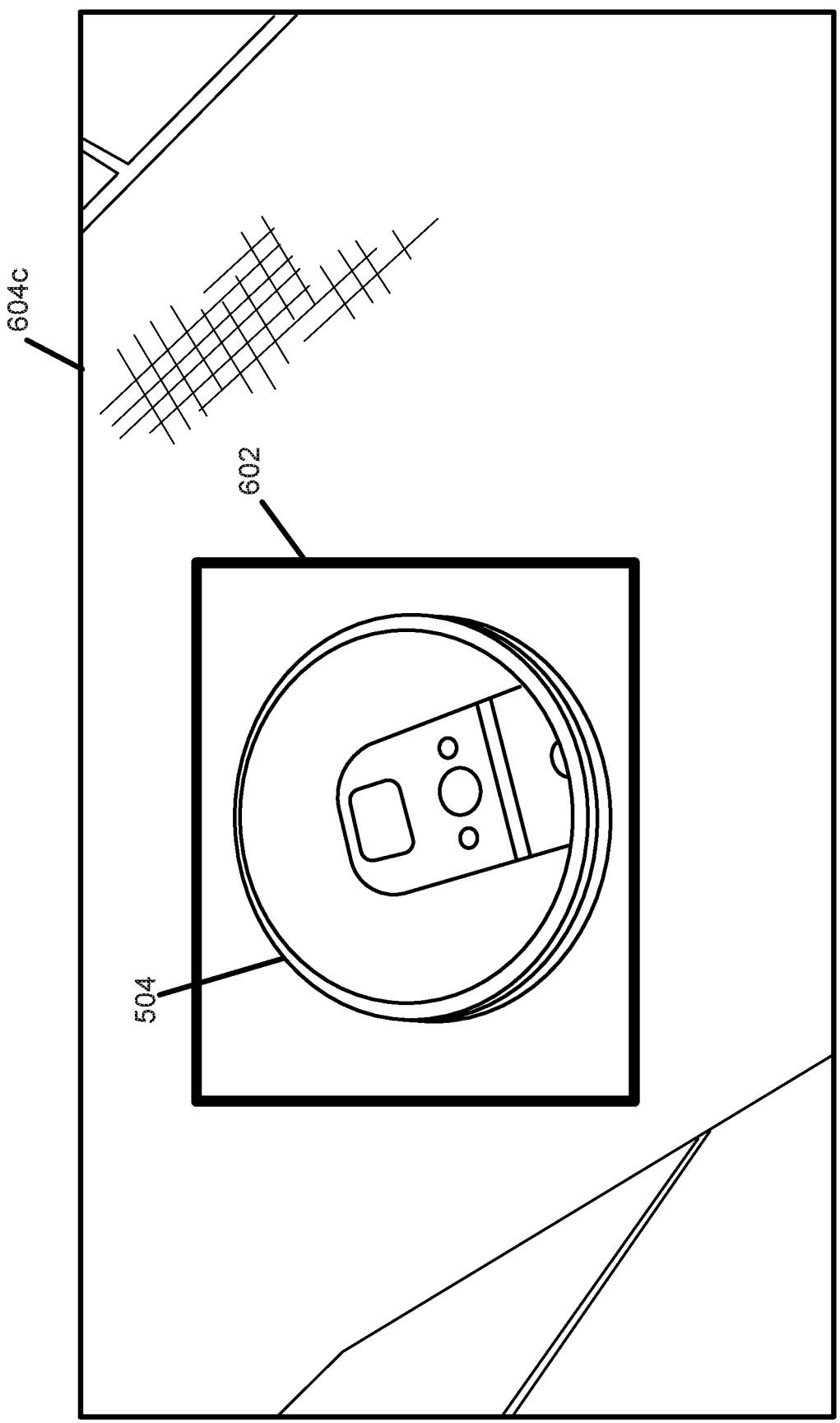
Figure 6D:
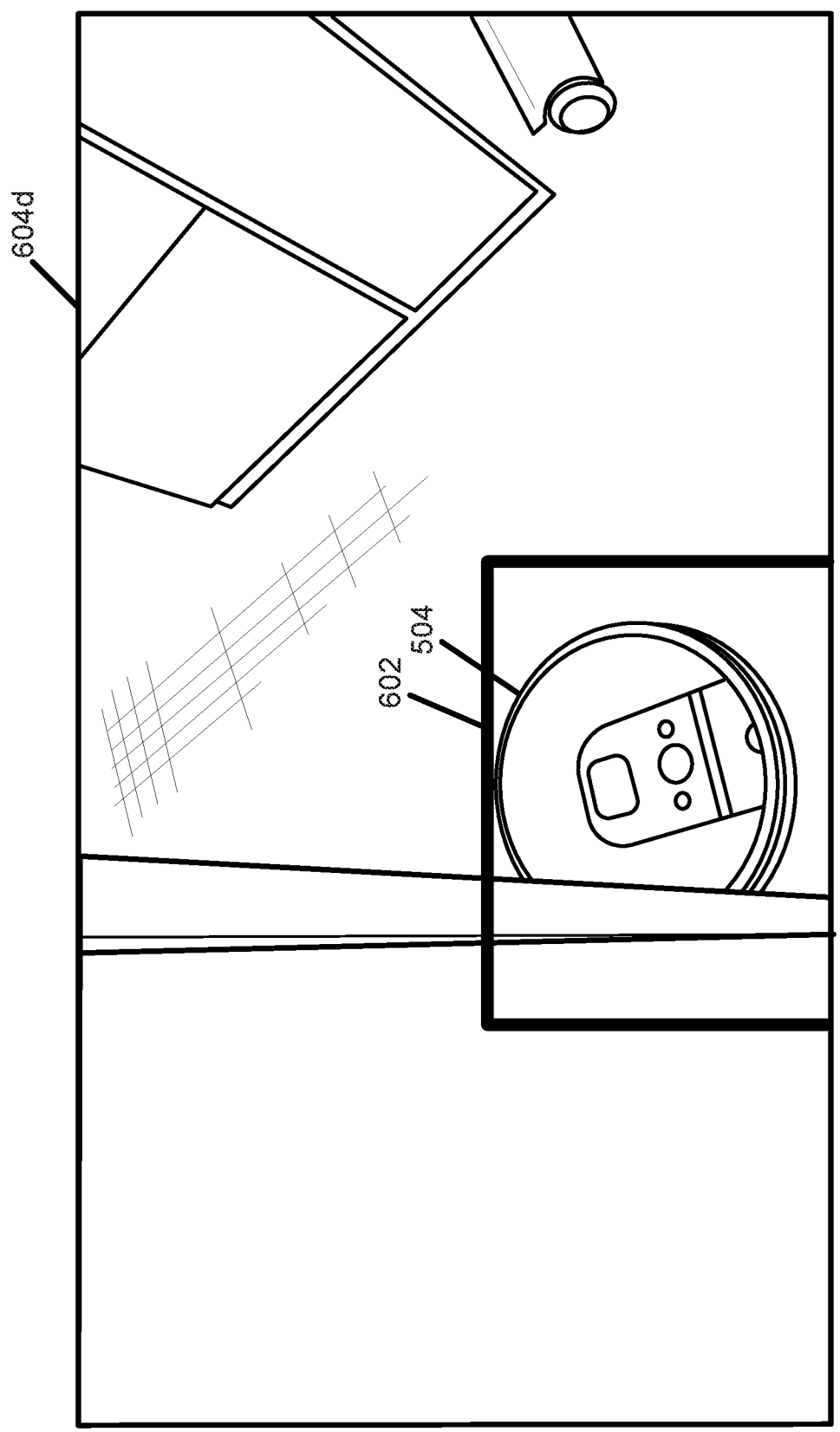
Figure 6E:
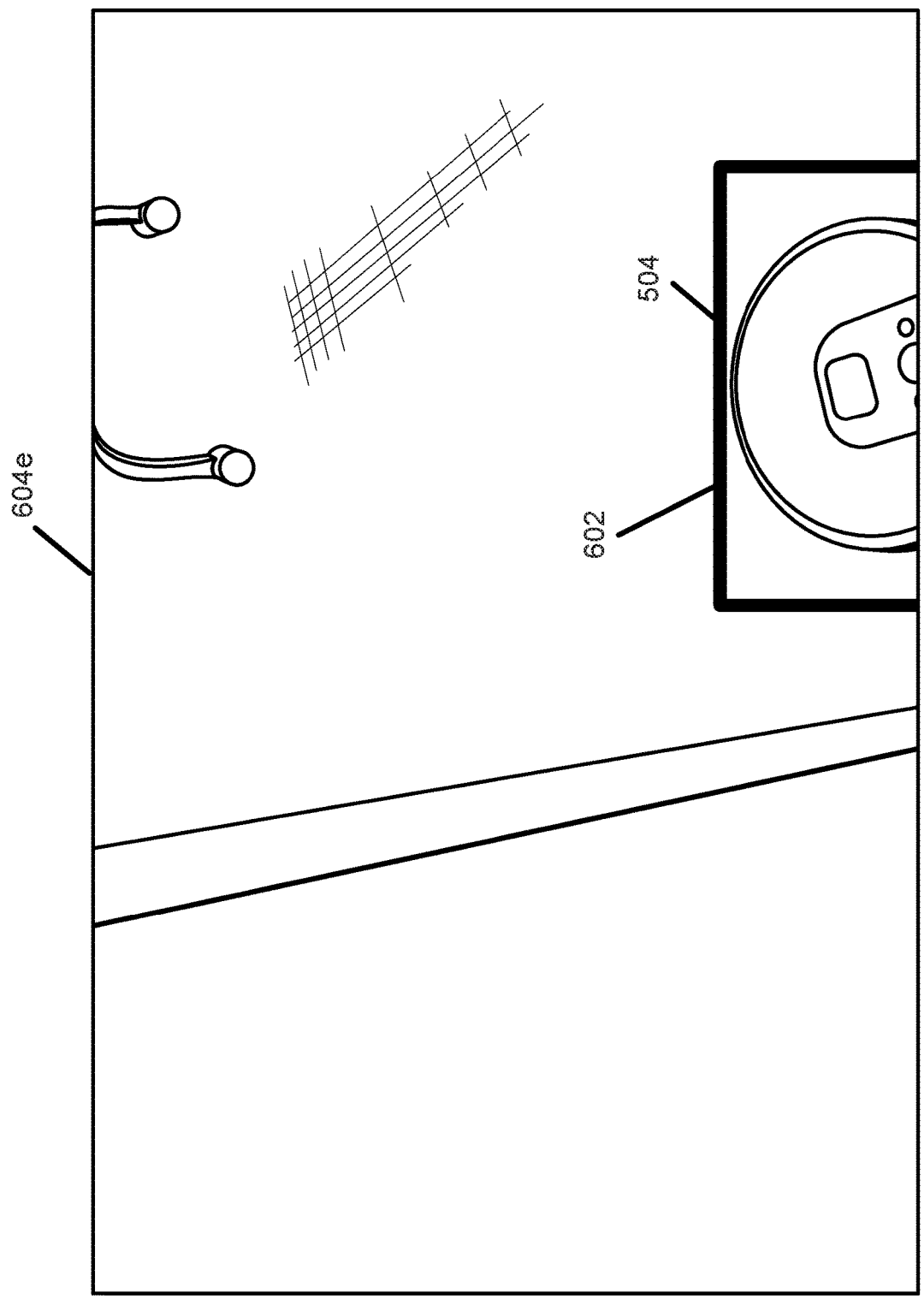
Figure 6F:
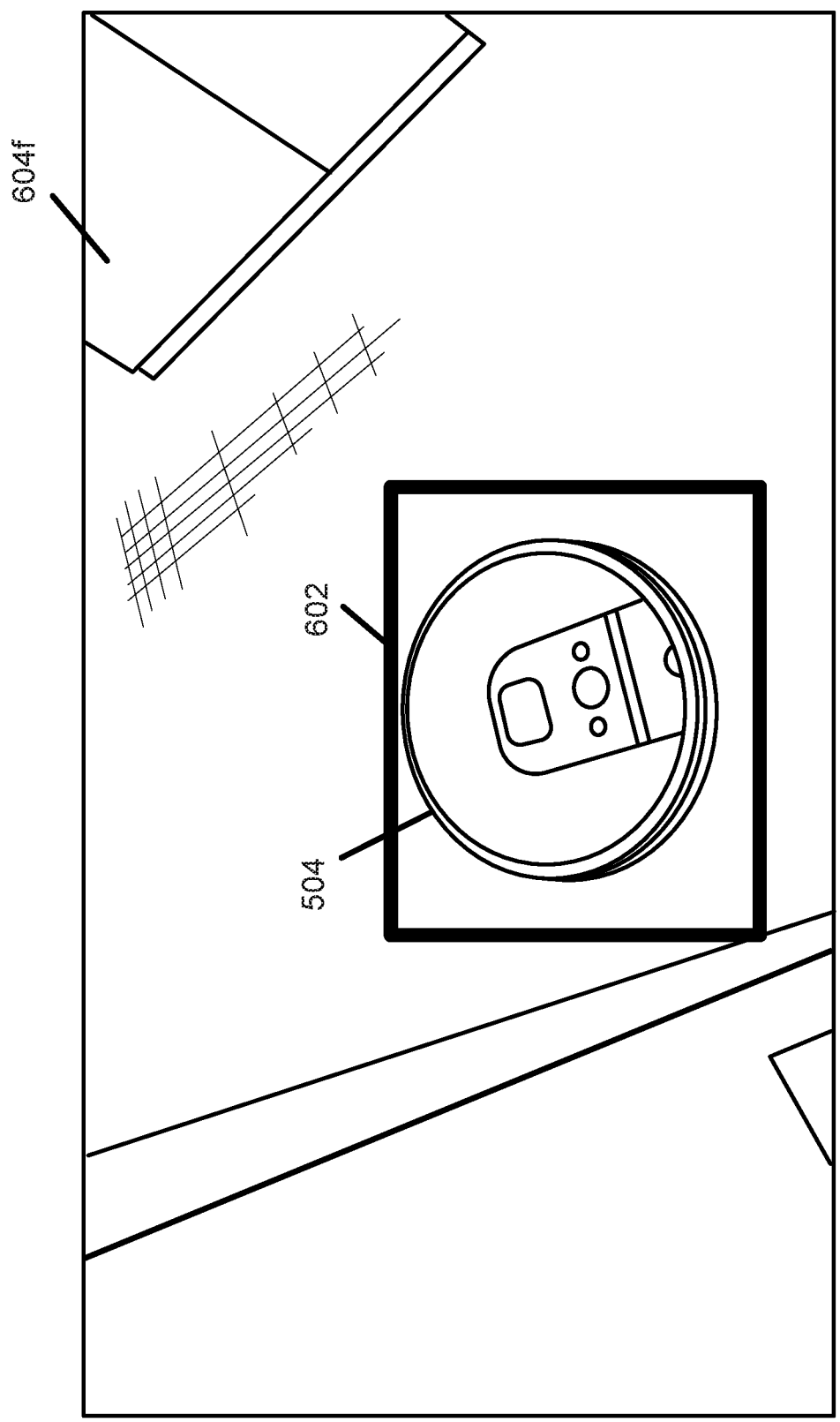
Figure 6G:
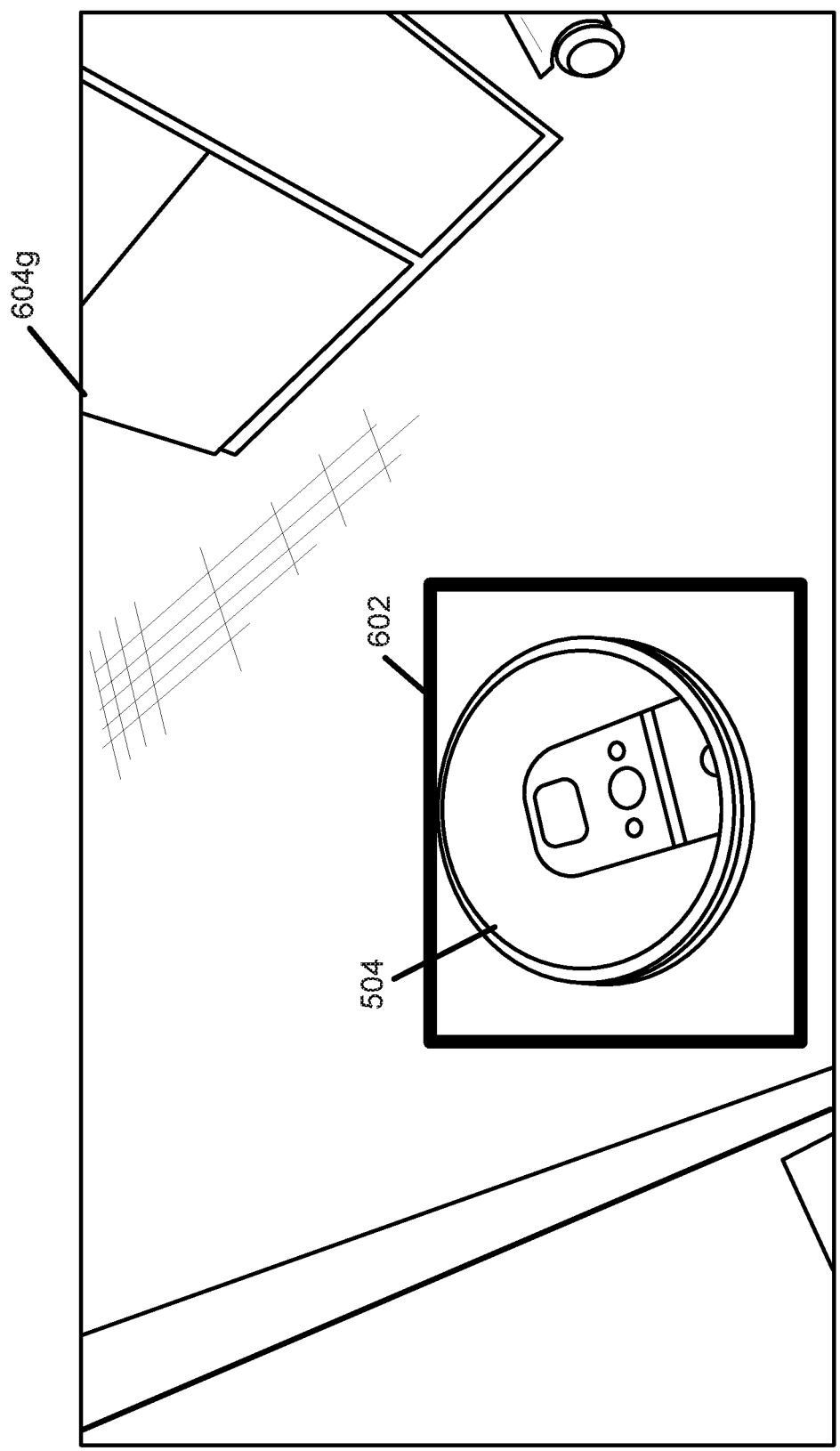

Referring to FIG. 4, the resulting set 124 of video frames can be provided to a training module 402 that uses the video frames in the set 124 to train a neural network 404 to recognize the object 102. In this example, the training module 402 and the neural network 404 are implemented on a server computer 406.

FIG. 5 shows an example raw image 502 of a mobile cleaning robot 504. Also shown is an example AR result image 506 in which a virtual robot 508 is overlaid on the mobile cleaning robot 504.

FIGS. 6A to 6G show examples of the difference set 124 of video frames 604a to 604g in which a bounding box 602 approximately bounds the mobile cleaning robot 504.

Figure 7:
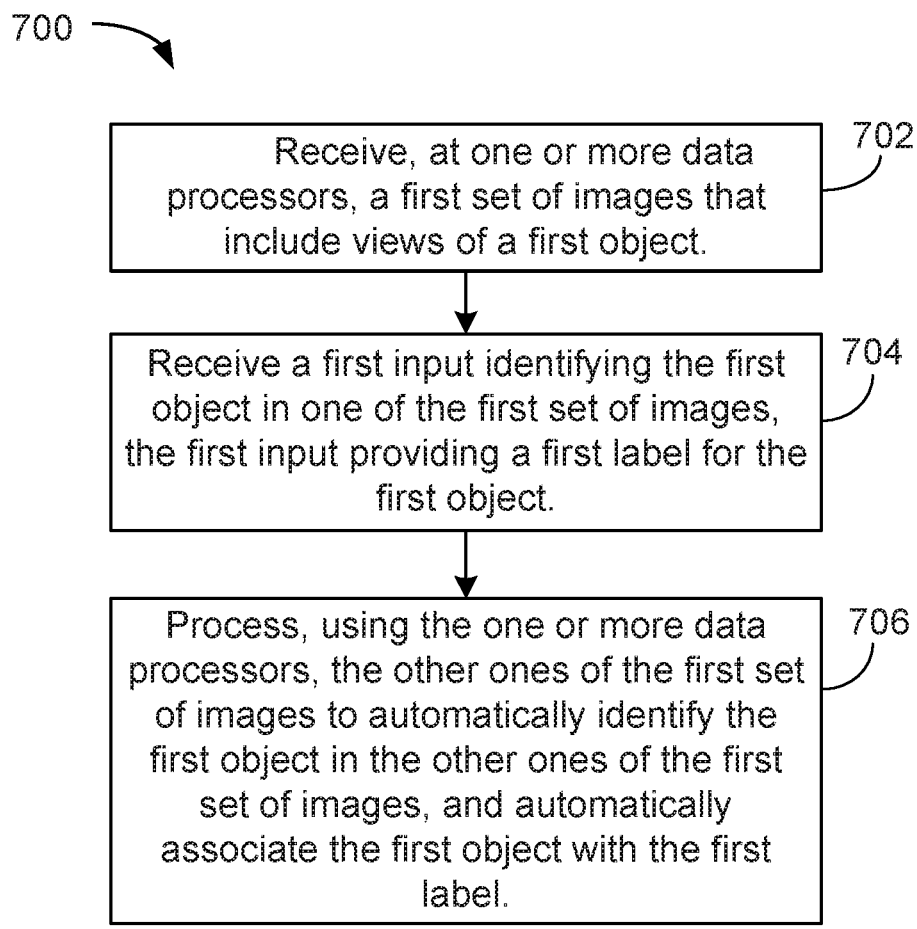
FIGS. 7 and 8 are flow diagrams of example processes for generating labeled images for use in training a machine learning module.

Referring to FIG. 7, a process for efficiently labeling images 700 is provided. The process 700 includes receiving 702, at one or more data processors, a first set of images that include views of a first object. For example, the data processors can be the data processors 106 of the mobile computing device 104.

The process 700 includes receiving 704 a first input identifying the first object in one of the first set of images, the first input providing a first label for the first object. For example, the mobile computing device 104 can receive an input from the user that provides a label for the object.

The process 700 includes processing 706, using the one or more data processors, the other ones of the first set of images to automatically identify the first object in the other ones of the first set of images, and automatically associate the first object with the first label. For example, the labeling program 116 determines a difference between raw video frames 120 and AR result video frames 122 and generates a difference set of video frames that include only the virtual object. For each video frame in the difference set, the labeling program 116 determines a bounding box that bounds the virtual object. The labeling program 116 then overlays the bounding box on the raw video frame, and associates the bounding box with the label provided by the user.

Figure 8:
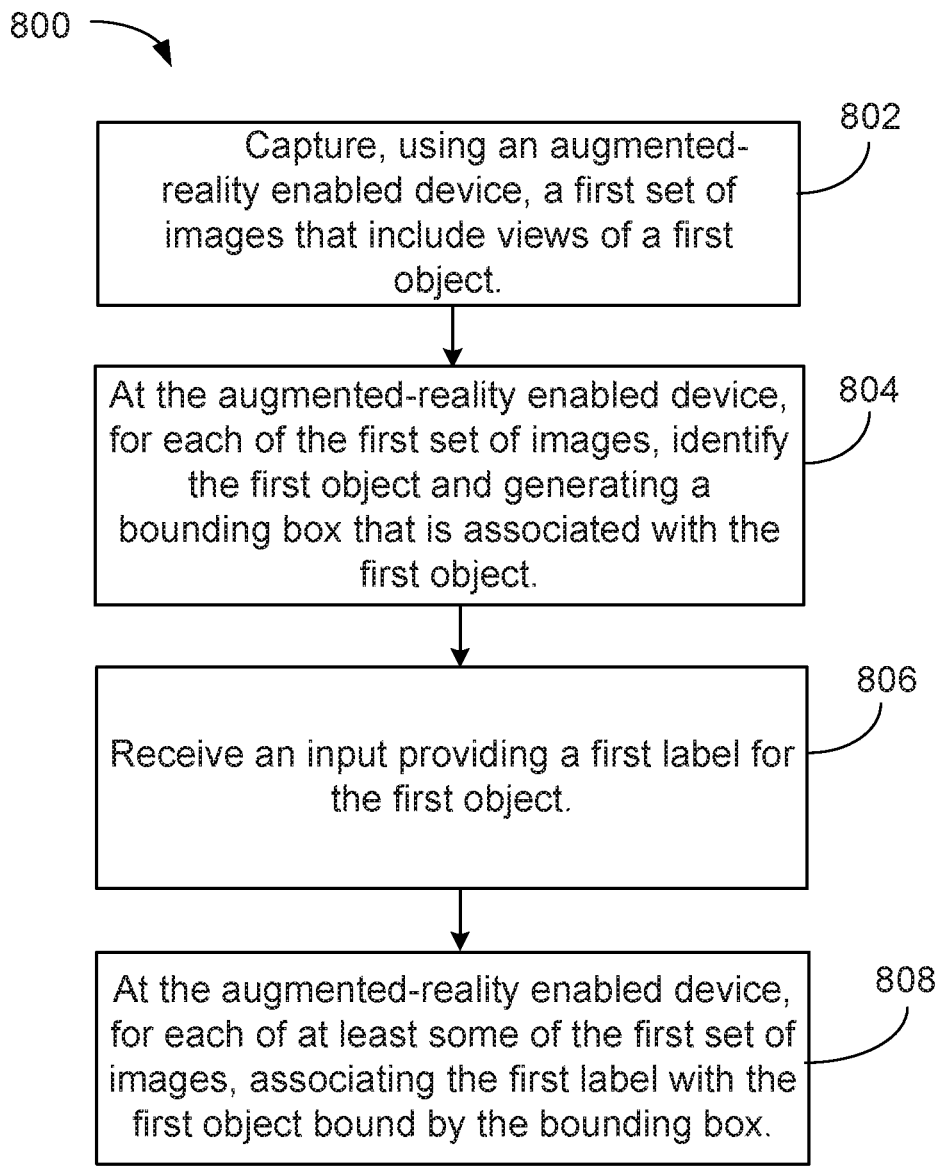

Referring to FIG. 8, a process 800 for efficiently labeling images is provided. The process 800 includes capturing 802, using an augmented-reality enabled device, a first set of images that include views of a first object. For example, the augmented-reality enabled device can be the mobile computing device 104 that includes the augmented reality toolkit 114. The camera 108 can be used to capture images that include views of an object.

The process 800 includes, at the augmented-reality enabled device, for each of the first set of images, identifying 804 the first object and generating a bounding box that is associated with the first object. For example, the labeling program 116 determines a difference between raw video frames 120 and AR result video frames 122 and generates a difference set of video frames that include only the virtual object. For each video frame in the difference set, the labeling program 116 determines a bounding box that bounds the virtual object. The labeling program 116 then overlays the bounding box on the raw video frame. The bounding box substantially bounds the object.

The process 800 includes receiving 806 an input providing a first label for the first object. For example, the mobile computing device 104 can receive an input from the user that provides a label for the object.

The process 800 includes, at the augmented-reality enabled device, for each of at least some of the first set of images, associating the first label with the first object bound by the bounding box. For example, the labeling program 116 associates the label provided by the user with the bounding box in each video frame of the set 124, effectively associating the label with the object bound by the bounding box.

Operations associated with automatically labeling images described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment. Control over all or part of the robots described in this document can be implemented using special purpose logic circuitry, e.g., an FPGA (field programmable gate array) and/or an ASIC (application-specific integrated circuit).

The data processor 106 of the mobile computing device 104 is suitable for the execution of a computer program and can include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

The processes for enabling automatic image labeling described above can be implemented using software for execution on one or more mobile computing devices, one or more mobile robots, and/or one or more remote computing devices. For instance, the software forms procedures in one or more computer programs that execute on one or more programmed or programmable computer systems, either in the mobile robots, the mobile computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port.

The software may be provided on a medium, such as a CD-ROM, DVD-ROM, or Blu-ray disc, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the invention, which is defined by the scope of the appended claims.

The mobile computing device 104 can be, e.g., a smart watch, a smart camera, a smart goggle, or any other portable device that is capable of performing the functions of the mobile computing device described above.

Other embodiments are within the scope of the following claims.

What is claimed is:

1. A computer-implemented method comprising:
   receiving, at one or more data processors, a first set of images that include views of a first object;
   establishing a coordinate system of a virtual space that corresponds to a real-world space in which the first object is located;
   receiving a first input identifying the first object in one of the first set of images, the first input providing a first label for the first object, the first label indicative of an identity of the first object;
   receiving a second input for overlaying a virtual object on the first object in the one of the first set of images; and
   processing, using the one or more data processors, the other ones of the first set of images, including:
   automatically overlaying the virtual object on the first object in the other ones of the first set of images,
   automatically identifying the first object in the other ones of the first set of images based on the virtual object in the other ones of the first set of images, and
   automatically associating the first object with the first label.

2. The method of claim 1, further comprising training a recognition module using the first set of images as input to the recognition module, in which the first object has been associated with the first label, to generate a trained recognition module that is configured to recognize the first object in additional images.

3. The method of claim 2, wherein the first set of images include views of a mobile cleaning robot, and the method comprises:
   processing the first set of images to generate a second set of images such that the second set of images include top-view images of the mobile cleaning robot, and
   processing the top-view images of the mobile cleaning robot to identify an orientation angle of the mobile cleaning robot; and
   wherein training the recognition module comprises training the recognition module to recognize an orientation angle of the mobile cleaning robot in additional images.

4. The method of claim 1 in which processing the other ones of the first set of images comprises, for each of at least some of the first set of images, identifying edges of the first object and generating a bounding box that bounds the edges of the first object.

5. The method of claim 4 in which processing the other ones of the first set of images comprises identifying the bounding box in each of the images and associating the first object within the bounding box with the first label.

6. The method of claim 1, comprising for each of the other ones of the first set of images, generating a bounding box that bounds the virtual object, and associating the first object within the bounding box with the first label.

7. The method of claim 6, comprising:
   for each of the other ones of the first set of images, prior to generating the bounding box, determining a difference between the image with the virtual object overlaid on the first object and the image without the virtual object, and
   determining a size and a position of the bounding box based on the difference.

8. The method of claim 1, comprising capturing a video that includes at least one of (i) images of the first object taken from a plurality of viewing angles relative to the first object, (ii) images of the first object taken from a plurality of distances relative to the first object, or (iii) images of the first object taken under a plurality of lighting conditions for the first object, in which the first set of images comprise frames of the video.

9. The method of claim 1, comprising:
   displaying, on a user interface, the one of the first set of images that includes the first object,
   receiving, through the user interface, the first input identifying the first object, and
   receiving, through the user interface, the first label for the first object.

10. The method of claim 1, comprising:
    training a recognition module using the first set of images as input to the recognition module, in which the first object has been associated with the first label, to generate a trained recognition module that is configured to recognize the first object in additional images not included in the first set of images.

11. An apparatus comprising:
    an input module configured to receive a first set of images that include views of a first object;
    an identification module configured to receive a first input identifying the first object in one of the first set of images, the first input providing a first label for the first object, wherein the first label is indicative of an identity of the first object, and
    an augmented reality module configured to:
    establish a coordinate system of a virtual space that corresponds to a real-world space in which the first object is located,
    receive a second input for overlaying a virtual object on the object in the one of the first set of images, and
    automatically overlay the virtual object on the first object in the other ones of the first set of images;
    wherein the identification module is further configured to process the other ones of the first set of images to automatically identify the first object in the other ones of the first set of images based on the virtual object in the other ones of the first set of images; and
    a labeling module configured to associate the first object in the first set of images with the first label.

12. The apparatus of claim 11, further comprising a training module configured to train a recognition module using the first set of images, in which the first object has been associated with the first label, to generate a trained recognition module configured to recognize the first object in additional images.

13. The apparatus of claim 11 in which the identification module is configured to:

for each of the other ones of the first set of images, generate a bounding box that bounds the virtual object, and wherein the labeling module is configured to associate the object within the bounding box with the first label.

14. The apparatus of claim 13 in which the identification module is configured to:

for each of the other ones of the first set of images, prior to generating the bounding box, determine a difference between the image with the virtual object overlaid on the first object and the image without the virtual object, and determine a size and a position of the bounding box based on the difference.

15. The apparatus of claim 11, in which the first set of images comprise frames of a video, and the identification module is configured to identify the first object in the frames of the video.

16. The apparatus of claim 11, comprising a user interface configured to:

display the one of the first set of images that includes the first object, receive the first input identifying the first object, and receive the first label for the first object.

\* \* \* \* \*